(12) United States Patent
Thubert et al.

(10) Patent No.: US 9,980,199 B2
(45) Date of Patent: May 22, 2018

(54) DOMINATING SET IDENTIFICATION FOR PATH COMPUTATION BASED ON REPEATING A TRANSMISSION WITHIN RANDOMIZED CONTENTION INTERVAL

(71) Applicant: Cisco Technology, Inc., San Jose, CA (US)

(72) Inventors: Pascal Thubert, La Colle sur Loup (FR); Jean-Philippe Vasseur, Saint Martin d'Uriage (FR); Patrick Wetterwald, Mouans Sartoux (FR); Eric Michel Levy-Abegnoli, Valbonne (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 73 days.

(21) Appl. No.: 15/258,484

(22) Filed: Sep. 7, 2016

(65) Prior Publication Data
US 2018/0070379 A1    Mar. 8, 2018

(51) Int. Cl.
*H04W 40/12* (2009.01)
*H04W 74/08* (2009.01)
(Continued)

(52) U.S. Cl.
CPC .......... *H04W 40/125* (2013.01); *H04L 1/189* (2013.01); *H04L 45/16* (2013.01); *H04W 24/02* (2013.01);
(Continued)

(58) Field of Classification Search
CPC ......... H04L 1/189; H04L 45/14; H04L 45/16; H04L 45/44; H04L 45/48; H04L 45/70;
(Continued)

(56) References Cited

U.S. PATENT DOCUMENTS

2014/0105015 A1* 4/2014 Hui ................. H04L 45/48
                                                      370/230.1
2015/0078204 A1    3/2015 Thubert et al.
(Continued)

OTHER PUBLICATIONS

Purohit et al., "Constructing Minimum Connected Dominating Set: Algorithmic approach", Int'l journal on applications of graph theory in wireless ad hoc networks and sensor networks (GRAPH-HOC), vol. 2, No. 3, [online], Sep. 2010, [retrieved on Aug. 8, 2016]. Retrieved from the Internet: URL: <http://airccse.org/journal/graphhoc/papers/0910jgraph5.pdf>, pp. 59-66.
Levis et al., "The Trickle Algorithm", Internet Engineering Task Force (IETF), Request for Comments: 6206, Mar. 2011, pp. 1-13.
Winter, Ed., et al., "RPL: IPv6 Routing Protocol for Low-Power and Lossy Networks", Internet Engineering Task Force (IETF), Request for Comments: 6550, Mar. 2012, pp. 1-157.
(Continued)

*Primary Examiner* — Timothy J Weidner
(74) *Attorney, Agent, or Firm* — Leon R. Turkevich

(57) ABSTRACT

In one embodiment, a method comprises: receiving, by a network device in a data network, a wireless data packet containing new data; responding to the wireless data packet, by the network device, by initiating a prescribed randomized collision avoidance method requiring the network device to first wait at least a first half of a prescribed minimum contention interval before attempting transmission at a randomized position within a second half of the prescribed minimum contention interval; selectively retransmitting, by the network device, the wireless data packet based on determining, at the randomized position, that the network device has not received a prescribed number of copies of the wireless data packet; and selectively sending, by the network device to a path computation element in the data network, a message requesting membership in a dominating set in response to transmission of the wireless data packet by the network device.

22 Claims, 5 Drawing Sheets

(51) Int. Cl.
*H04W 52/02* (2009.01)
*H04W 28/06* (2009.01)
*H04W 28/02* (2009.01)
*H04W 24/02* (2009.01)
*H04L 12/761* (2013.01)
*H04L 1/18* (2006.01)

(52) U.S. Cl.
CPC ......... *H04W 28/021* (2013.01); *H04W 28/06* (2013.01); *H04W 52/0203* (2013.01); *H04W 74/085* (2013.01)

(58) Field of Classification Search
CPC ................. H04L 69/32; H04W 24/02; H04W 28/02–28/0242; H04W 40/005–40/38; H04W 52/0203–52/0206; H04W 74/0833–74/0858; H04W 80/04; H04W 84/005; H04W 84/047; H04W 84/18–84/22; H04W 88/04; H04W 88/14; H04W 92/045; H04W 92/14; H04W 92/24
See application file for complete search history.

(56) References Cited

U.S. PATENT DOCUMENTS

2015/0373735 A1    12/2015  Thubert et al.
2017/0353978 A1*   12/2017  Ulinskas ............... H04W 76/02
                                                          370/255

OTHER PUBLICATIONS

Shelby, Ed. et al., "Neighbor Discovery Optimization for IPv6 over Low-Power Wireless Personal Area Networks (6LoWPANs)", Internet Engineering Task Force (IETF), Request for Comments: 6775, Nov. 2012, pp. 1-55.
Watteyne et al., "Using IEEE 802.15.4e Time-Slotted Channel Hopping (TSCH) in the Internet of Things (IoT): Problem Statement", Internet Engineering Task Force, Request for Comments: 7554, May 2015, pp. 1-23.
Hui et al., "Multicast Protocol for Low=Power and Lossy Networks (MPL)", Internet Engineering Task Force (IETF), Request for Comments: 7731, Feb. 2016, pp. 1-29.
Thubert et al., "IETF 6TSCH: Combining IPv6 Connectivity with Industrial Performance", 2013 Seventh International Conference on Innovative Mobile and Internet Services in Ubiquitous Computing, IEEE, Jul. 3, 2013, XP032485811, pp. 541-546.

* cited by examiner

DOMINATING SET IDENTIFICATION FOR PATH COMPUTATION BASED ON REPEATING A TRANSMISSION WITHIN RANDOMIZED CONTENTION INTERVAL

TECHNICAL FIELD

The present disclosure generally relates to dominating set identification for a path computation based on repeating a transmission within a randomized contention interval.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Low power and Lossy Networks (LLNs) allow a large number (e.g., tens of thousands) of resource-constrained devices to be interconnected to form a wireless mesh network. The Internet Engineering Task Force (IETF) has proposed a routing protocol ("6TiSCH") that provides IPv6 routing using time slotted channel hopping (TSCH) based on IEEE 802.15.4e. Although a centralized entity such as a Path Computation Entity (PCE) can be used for route calculation between a small number of different network devices, the complexity in calculating a TSCH schedule by the PCE limits the number of network devices to less than one hundred (100) within the network, or more typically no more than about thirty (30) network devices, as the PCE is incapable of maintaining the peerings between a larger number of network devices. Hence, a PCE is incapable of calculating 6TiSCH routes between network devices in a data network containing a larger number of network devices.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
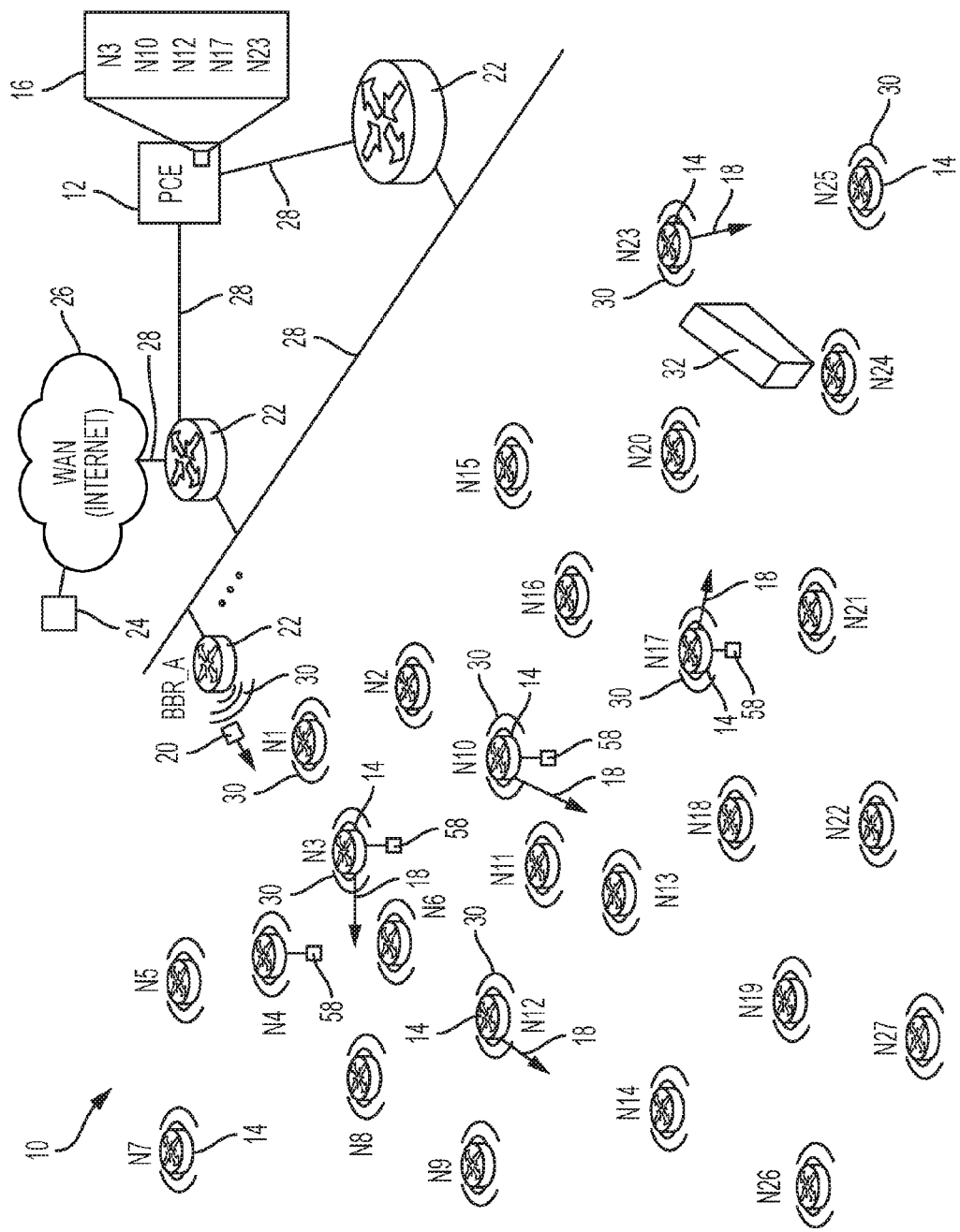
FIG. 1 illustrates an example data network having an apparatus for classifying, as members of a dominating set, network devices having retransmitted a data packet according to a prescribed collision avoidance method, according to an example embodiment.

In one embodiment, a method comprises: receiving, by a network device in a data network, a wireless data packet containing new data; responding to the wireless data packet, by the network device, by initiating a prescribed randomized collision avoidance method requiring the network device to first wait at least a first half of a prescribed minimum contention interval before attempting transmission at a randomized position within a second half of the prescribed minimum contention interval; selectively retransmitting, by the network device, the wireless data packet based on determining, at the randomized position, that the network device has not received a prescribed number of copies of the wireless data packet; and selectively sending, by the network device to a path computation element in the data network, a message requesting membership in a dominating set in response to transmission of the wireless data packet by the network device.

In another embodiment, an apparatus comprises a device interface circuit and a processor circuit. The device interface circuit is configured for receiving, in a data network, a wireless data packet containing new data. The processor circuit is configured for responding to the wireless data packet by initiating a prescribed randomized collision avoidance method requiring the apparatus to first wait at least a first half of a prescribed minimum contention interval before attempting transmission at a randomized position within a second half of the prescribed minimum contention interval. The processor circuit further is configured for selectively retransmitting the wireless data packet via the device interface circuit based on determining, at the randomized position, that the apparatus has not received a prescribed number of copies of the wireless data packet. The processor circuit further is configured for selectively sending, via the device interface circuit to a path computation element in the data network, a message requesting membership in a dominating set in response to transmission of the wireless data packet by the apparatus.

In another embodiment, one or more non-transitory tangible media encoded with logic for execution by a machine and when executed by the machine operable for: receiving, by the machine implemented as a network device in a data network, a wireless data packet containing new data; responding to the wireless data packet, by the network device, by initiating a prescribed randomized collision avoidance method requiring the network device to first wait at least a first half of a prescribed minimum contention interval before attempting transmission at a randomized position within a second half of the prescribed minimum contention interval; selectively retransmitting, by the network device, the wireless data packet based on determining, at the randomized position, that the network device has not received a prescribed number of copies of the wireless data packet; and selectively sending, by the network device to a path computation element in the data network, a message requesting membership in a dominating set in response to transmission of the wireless data packet by the network device.

In another embodiment, a method comprises: a path computation device receiving device information from requesting network devices, each requesting network device having retransmitted a data packet in a data network according to a prescribed randomized collision avoidance method requiring each network device in the data network to first wait at least a first half of a prescribed contention interval before attempting transmission, at a corresponding randomized position within a second half of the prescribed minimum contention interval, if the corresponding network device has not received a prescribed number of copies of the wireless data packet; and the path computation device classifying each requesting network device having retransmitted the data packet, according to the prescribed randomized collision avoidance method, as belonging to a dominating set, for generation of optimized routes for reaching any network device in the data network via one or more of the requesting network devices.

In another embodiment, one or more non-transitory tangible media encoded with logic for execution by a machine and when executed by the machine operable for: a path computation device receiving device information from requesting network devices, each requesting network device having retransmitted a data packet in a data network according to a prescribed randomized collision avoidance method requiring each network device in the data network to first wait at least a first half of a prescribed contention interval before attempting transmission, at a corresponding randomized position within a second half of the prescribed minimum contention interval, if the corresponding network device has not received a prescribed number of copies of the wireless data packet; and the path computation device classifying each requesting network device having retransmitted the data packet, according to the prescribed randomized collision avoidance method, as belonging to a dominating set, for generation of optimized routes for reaching any network device in the data network via one or more of the requesting network devices.

DETAILED DESCRIPTION

Particular embodiments enable an efficient identification of network devices to be used by a Path Computation Element (PCE) device for generation of optimized routes, based on classifying as dominating set members those network devices that successfully retransmit a wireless data packet according to a prescribed randomized collision avoidance method, such as the Trickle algorithm according to the IETF Request for Comments (RFC) 6206. The PCE, upon classifying those network devices that successfully retransmit the wireless data packet as dominating set members, can generate optimized routes for reaching any network device in the data network via one or more of the dominating set members. The optimized route can be deployed, for example within a time slotted channel hopping (TSCH) network based on IEEE 802.15.4e, for example a "6TiSCH" network.

Moreover, the identification of dominating set members based on successfully retransmitting a data packet according to a prescribed randomized collision avoidance method enables scalable generation of optimized routes, since the prescribed randomized collision avoidance method (e.g., the Trickle algorithm) can ensure that redundant nodes in relatively dense areas of the network suppress retransmission attempts if the redundant nodes already have received a prescribed number of copies of the data packet.

The identification of dominating set members also can be repeated, for example on a periodic basis, to form a new random set of dominating set of members to ensure that a given resource-constrained network device does not deplete an excessive amount of battery power. Parameters in the prescribed randomized collision avoidance method also can be adjusted based on prescribed device attributes, enabling for example line-powered network devices (i.e., network devices powered by a powerline power source) to acquire a greater probability of becoming a dominating set member compared to battery-operated network devices; parameters in the prescribed randomized collision avoidance method also can be adjusted based on battery level, enabling battery-powered network devices having low battery levels to minimize their probability of becoming a dominating set member.

FIG. 1 is a diagram illustrating an example data network 10 having an apparatus 12 for selectively classifying network devices (e.g., wireless network devices "N1" through "N27") 14 as belonging to a dominating set 16 based on retransmission 18 of a wireless data packet 20, according to an example embodiment. Although only the wireless network devices "N3", "N7", "N10", "N12", "N17", "N23", and "N25" are labeled in FIG. 1 with the reference numeral "14" to avoid cluttering, it should be apparent that all the network devices "N1" through "N27" are allocated the reference numeral "14" for purposes of the description herein.

The data network 10 also can include wired router devices 22 configured for communications with any one of the devices 12, 14, or a remote host network device 24 via a wide area network (WAN) 26 such as the Internet, via wired data links 28 and/or wireless data links 30. The border router "BBR_A" 22 and all the wireless network devices "N1" through "N27" 14 are configured for establishing wireless data links 30 (illustrated as curved lines radiating from each device 14 or 22), even though only the wireless data links for the border router "BBR_A" 22 and the wireless network devices "N1", "N3", "N10", "N12", "N17", "N23", and "N25" are labeled with the reference numeral "30" to avoid cluttering in the Figures.

As illustrated in FIG. 1, the apparatus 12, implemented for example as a Path Computation Element (PCE) device, is configured for optimization of time-slotted channel-mapped routes (e.g. 6TiSCH tracks) in a deterministic network 10 to provide reachability to each of the network devices "N1" through "N27" 14. The example data network 10 in FIG. 1 illustrates twenty-seven network devices "N1" through "N27" 14, however a low-power and lossy network could have tens of thousands of such wireless network devices 14 in the data network 10. Hence, the relative complexity in calculating time-slotted channel-mapped routes in a deterministic network is not scalable for a PCE device 12, especially as numerous optimization constraints (e.g., latency, throughput, minimized error rate, etc.) can result in an NP-complete problem (nondeterministic polynomial time) that causes an exponential increase in the computational cost of finding an acceptable solution for an increasing number of constrained paths as the number of network devices 14 increases.

Further, a low-power and lossy network can have network devices 14 distributed at different densities (number of network devices per unit area), such that higher-density areas containing a greater number of network devices could encounter increased interference between the network devices, whereas lower-density areas could result in "shadows" where an isolated network device (e.g., "N25") 14 having limited reachability with other wireless network devices 14 due to an obstruction 32 could have unreliable coverage if a specific network device was not chosen to provide reachability for the isolated network device.

According to example embodiments, the identification of wireless network devices that retransmit a wireless data packet according to a prescribed randomized collision avoidance method (e.g., according to the Trickle algorithm) as dominating set members provides an efficient scalable method for enabling a PCE to identify routers for establishment of deterministic routes in a data network 10, regardless of the density of the network devices, ensuring that each network device has a highest probability of reachability in the data network 10. As described below, the retransmission can be executed across one or more retransmission cycles, where each retransmission cycle includes one or more contention intervals, providing a greater probability that a wireless network device in a lower-density area can detect a retransmitted data packet, even if the data packet was not detected during the first retransmission cycle. As described below, the example embodiments enable an isolated wireless network device, having first received a retransmitted data packet only after the first retransmission cycle, to request that a transmitting network device be part of the dominating set 16 to guarantee reachability, without excessively expanding the size of the dominating set membership.

Figure 2:
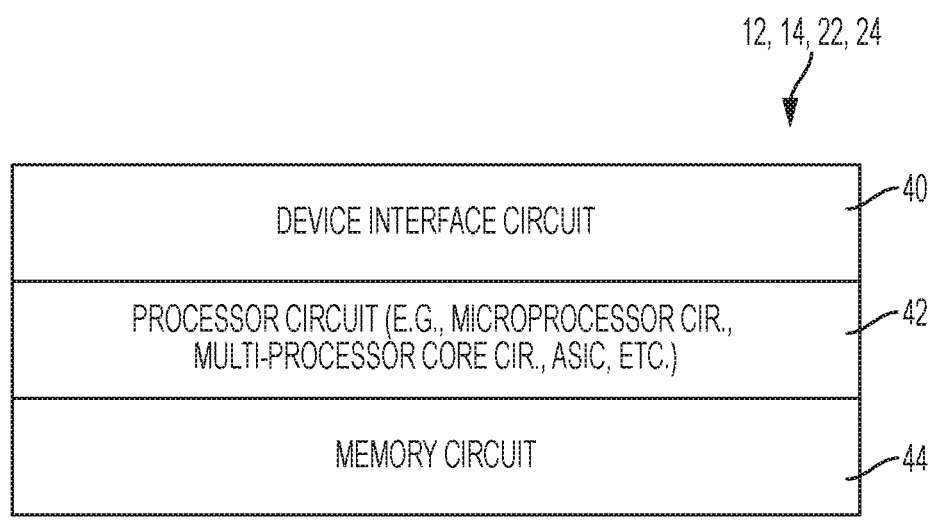
FIG. 2 illustrates an example implementation of any one of the network devices of FIG. 1, according to an example embodiment.

FIG. 2 illustrates an example implementation of any one of the devices 12, 14, 22, and/or 24 of FIG. 1, according to an example embodiment. Each apparatus 12, 14, 22, and/or 24 is a physical machine (i.e., a hardware device) configured for implementing network communications with other physical machines via the data network 10 and/or the WAN 26. The term "configured for" or "configured to" as used herein with respect to a specified operation refers to a device and/or machine that is physically constructed and arranged to perform the specified operation. Hence, the each apparatus 12, 14, 22, and/or 24 is a network-enabled machine implementing network communications via the data network 10 and/or the WAN 26.

Each apparatus 12, 14, 22, and/or 24 can include a device interface circuit 40, a processor circuit 42, and a memory circuit 44. The device interface circuit 40 can include one or more distinct physical layer transceivers for communication with any one of the other devices 12, 14, 22, and/or 24; the device interface circuit 40 also can include an IEEE based Ethernet transceiver for communications with the devices of FIG. 1 via any type of data link (e.g., a wired or wireless link, an optical link, etc.). The processor circuit 42 can be configured for executing any of the operations described herein, and the memory circuit 44 can be configured for storing any data or data packets as described herein.

Any of the disclosed circuits of the devices 12, 14, 22, and/or 24 (including the device interface circuit 40, the processor circuit 42, the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Figure 3A:
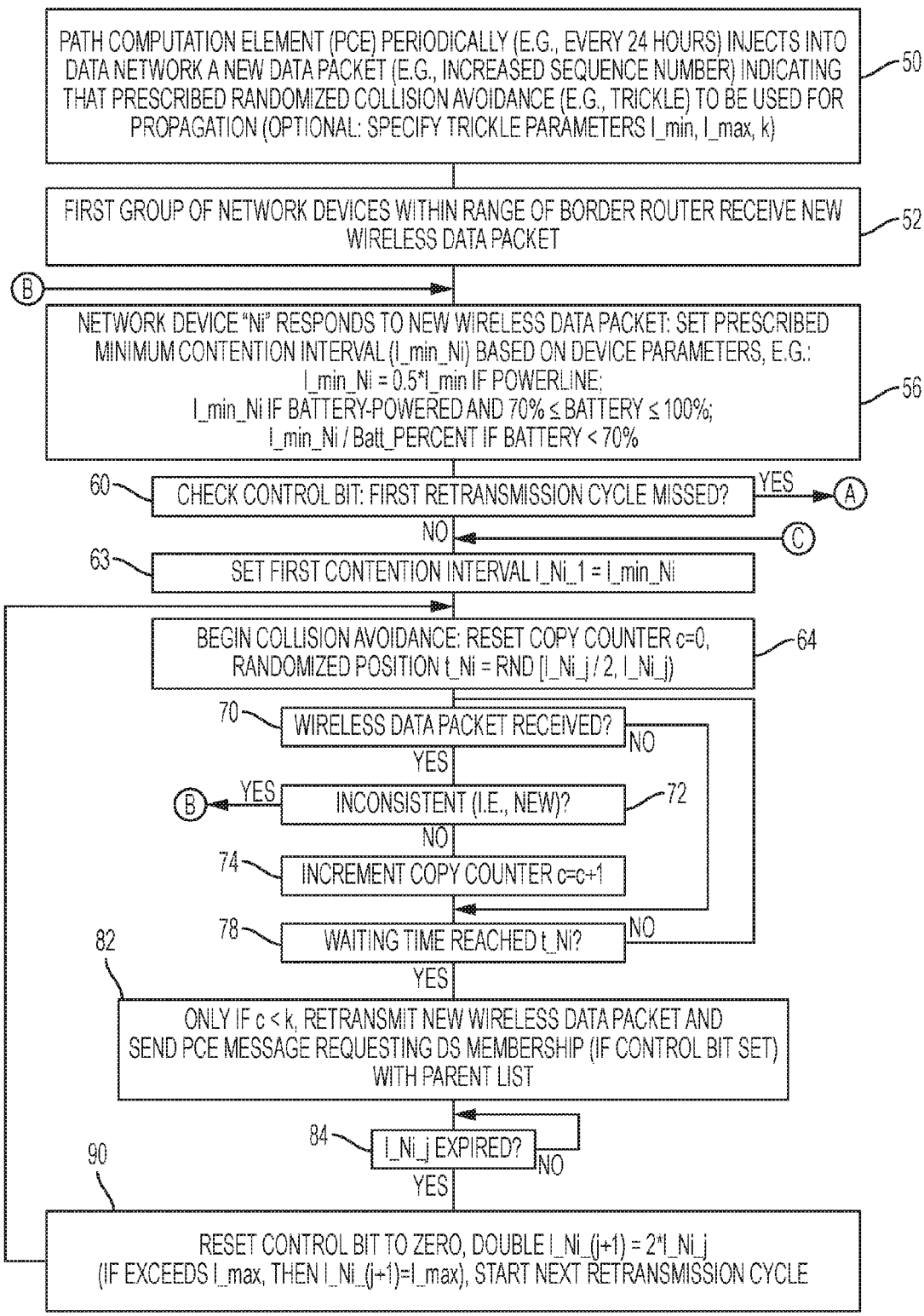
FIGS. 3A and 3B illustrate an example method of classifying, as members of a dominating set, network devices having retransmitted a data packet according to a prescribed collision avoidance method, according to an example embodiment.
Figure 3B:
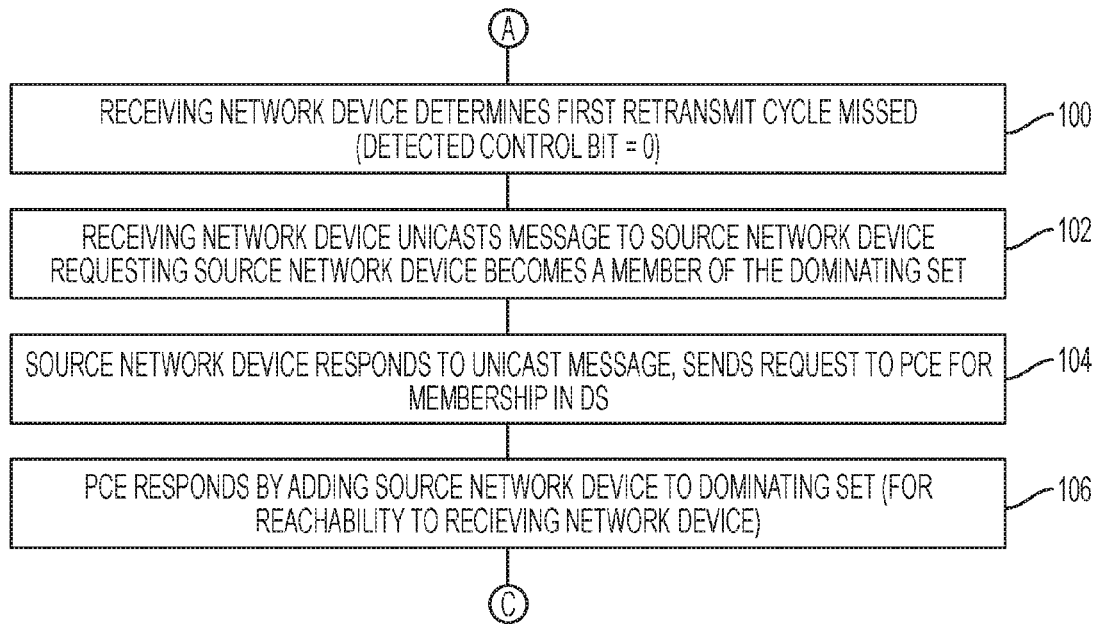
Figure 4:
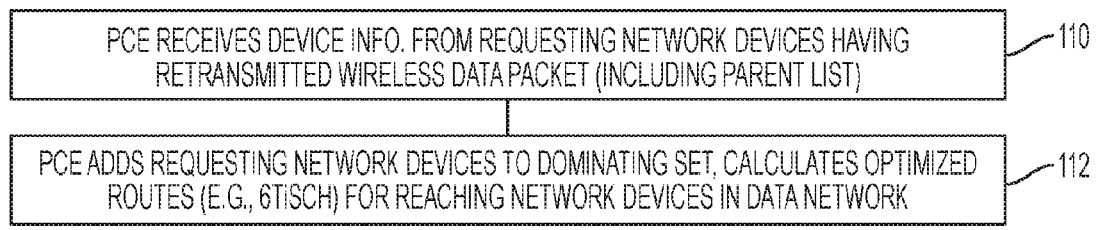
FIG. 4 illustrates an example method, by a path computation element (PCE) device, of classifying members of a dominating set based on retransmission of a data packet, for calculation of optimized routes, according to an example embodiment.
Figure 5:
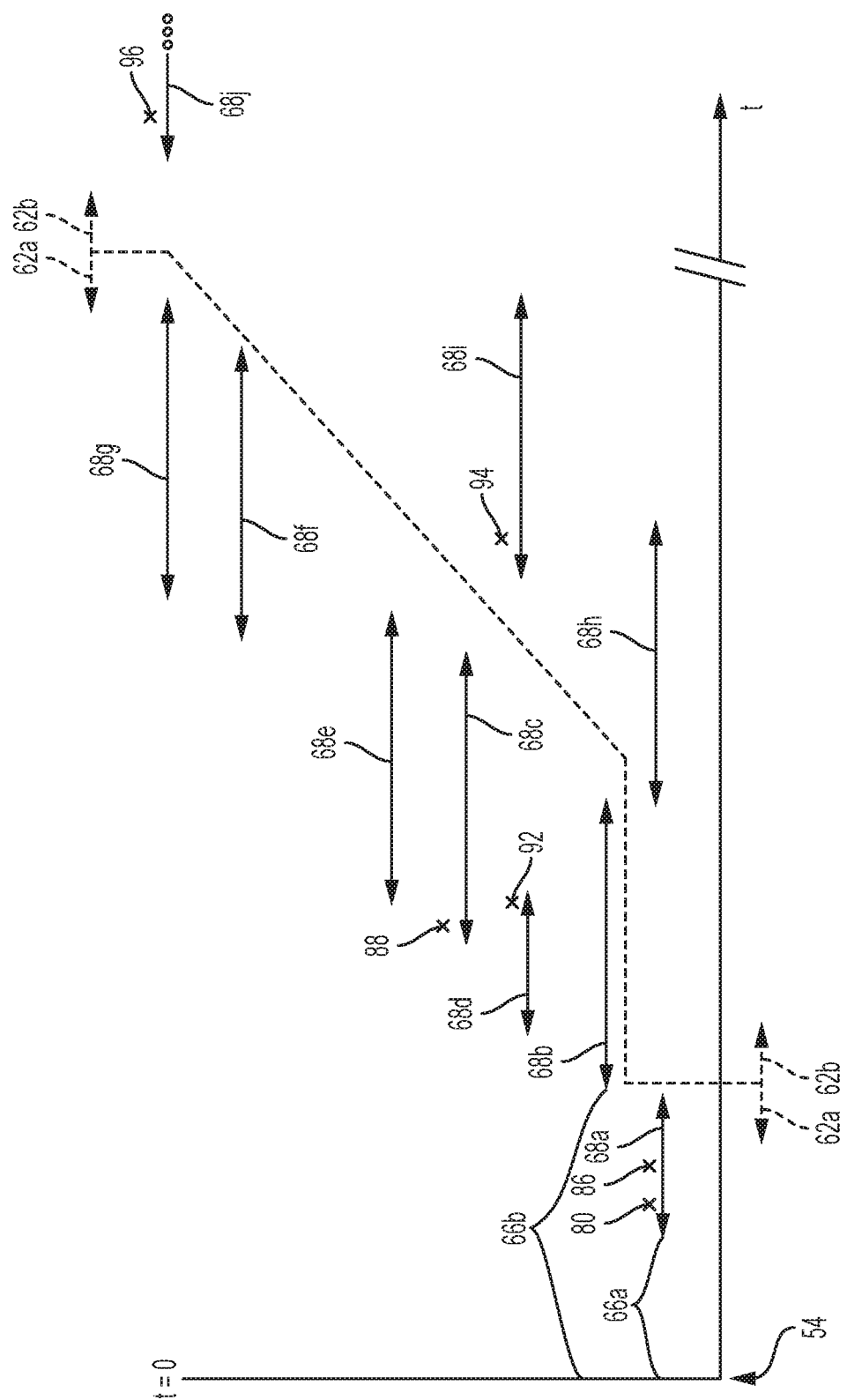
FIG. 5 illustrates example retransmissions of a message by wireless network devices across multiple contention intervals according to a prescribed randomized collision avoidance method, for identification of dominating set members, according to an example embodiment.

FIGS. 3A and 3B illustrate an example method of classifying, as members of a dominating set, network devices having retransmitted a data packet according to a prescribed collision avoidance method, according to an example embodiment. FIG. 4 illustrates an example method, by a path computation element (PCE) device, of classifying members of a dominating set based on retransmission of a data packet, for calculation of optimized routes, according to an example embodiment. FIG. 5 illustrates example retransmissions of a message by wireless network devices across multiple contention intervals according to a prescribed randomized collision avoidance method illustrated in FIGS. 3A and 3B, for identification of dominating set members, according to an example embodiment. The operations described with respect to any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Referring to FIG. 3A, the processor circuit 42 of the PCE device 12 in operation 50 can periodically generate and inject (i.e., transmit) into the data network 10, via the border router device "BBR_A" 22, a new wireless data packet 20 that specifies, for example, a new sequence number that identifies the wireless data packet 20 as a "new" or "inconsistent" data packet for propagation throughout the data network 10 according to a prescribed randomized collision avoidance method such as the Trickle algorithm. The new wireless data packet 20 can optionally specify the necessary parameters to be used for executing the prescribed randomized collision avoidance method; for example, the wireless data packet 20 can specify a prescribed (non-priority) minimum contention interval "I_min", a prescribed maximum contention interval "I_max", and a prescribed number of copies "k" (i.e., a redundancy constant) used to identify whether retransmission is required. Alternately, the parameters I_min, I_max, and k can be supplied to each wireless network device 14 via alternate methods, for example a distinct control message from the PCE device 12 or another control device such as an administrator via the remote host network device 24, or manual configuration.

The new wireless data packet 20 can be received in operation 52 by the device interface circuit 40 of wireless network devices 14 within wireless range of the border router device BBR_A" 22, illustrated by event 54 in FIG. 5. For example, the wireless network devices "N1" through "N10" 14 can be within the wireless range of the border router device BBR_A" 22, and therefore can detect in operation 52 at event 54 the new wireless data packet 20. In response to detecting the new wireless data packet 20, the processor circuit 42 of each of the wireless network devices "N1" through "N10" 14 can initiate the prescribed randomized collision avoidance method, described below.

In particular, the processor circuit 42 of each of the wireless network devices "Ni" having received the new wireless data packet 20 at event 54 (e.g., "N1" through "N10") 14 can initiate the prescribed randomized collision avoidance method in operation 56 based on selecting the prescribed minimum contention interval "I_min_Ni" based on selected device attributes and/or parameters. For example, the wireless network devices "N3", "N4", "N10", and "N17" 14 are illustrated in FIG. 1 as powered by a powerline power source 58 from an electrical power grid or alternative power source (e.g., 110 VAC power supply, 12V DC power supply, generator supply, solar/wind powered, etc.); hence the wireless network devices having access to a powerline source 58 are not constrained by battery life compared to other wireless network devices 14 having a battery-only power source (e.g., "CR2477" type lithium battery), and can therefore select a priority minimum contention interval (e.g., "I_min_Ni=0.5*I_min" that is substantially less than the non-priority minimum contention interval "I_min". As illustrated in operation 56, the priority minimum contention interval can be half the non-priority minimum contention interval "I_min".

Hence, the wireless network devices "N3", "N4", and "N10" in operation 56 can respond to the new wireless data packet 20 at event 54 by selecting the priority minimum contention interval "0.5*I_min" as the prescribed minimum contention interval, in other words "I_min_N3=0.5*I_min", "I_min_N4=0.5*I_min", and "I_min_N10=0.5*I_min". The remaining battery-only wireless network devices "N1", "N2", and "N5" through "N9" 14 having detected the new wireless data packet 20 transmitted by the border router device "BBR_A" at event 54 can select the corresponding minimum contention interval "I_min_N1" based on their battery level; for example, the processor circuit 42 of a battery-only wireless network device 14 can select the prescribed non-priority minimum contention interval "I_min" if its corresponding battery level is seventy percent (70%) or greater; the processor circuit 42 of a battery-only wireless network device also can select a longer minimum contention level (relative to a percentage of their battery level) if the battery level is less than a prescribed amount, for example less than seventy percent (70%), for example based on dividing the prescribed non-priority minimum contention interval "I_min" by the percentage which has a value less than one.

In response to receiving the new wireless data packet 20 at event 54, the processor circuit 42 of each of the wireless network devices "N1" through "N10" 14 can determine in operation 60 whether a control bit in the new wireless data packet 20 is set to one or reset to zero; as described in further detail below, the new wireless data packet 20 generated by the PCE device 12 contains a control bit set to one to identify a first retransmission cycle (62a of FIG. 5), and after the first retransmission cycle 62a the wireless network devices 14 can reset the control bit to zero to enable other wireless network devices 14 to distinguish between the first retransmission cycle 62a and subsequent retransmission cycles (e.g., 62b of FIG. 5). Hence, any initial retransmission by a wireless network device 14 in the first retransmission cycle 62a maintains the control bit set to one to identify the first retransmission cycle 62a.

Following selecting the prescribed minimum contention interval "I_min_Ni" based on the selected device attributes and/or parameters, the processor circuit 42 of each of the wireless network devices "N1" through "N10" 14 at operation 63 initiates the prescribed randomized collision avoidance method at event 54 by setting the first contention interval "I_Ni_j" to equal the prescribed minimum contention interval "I_min_Ni", where "j" equals the current retransmission cycle.

Each of the wireless network devices "N1" through "N10" 14 at event 54 begin collision avoidance at operation 64 by resetting the corresponding copy counter "c" to zero, and selecting a randomized position "t_Ni" within a second half of the prescribed minimum contention interval "I_Ni_j", namely "t_Ni" is randomly selected to be greater than or equal to "I_Ni_j/2" and less than "I_Ni_j".

The processor circuit 42 of each of the wireless network devices "N1" through "N10" 14 in operation 64 waits at least a first half of its prescribed minimum contention interval "I_Ni_j" before attempting transmission at its corresponding randomized position "t_Ni". Assuming in FIG. 5 that the prescribed non-priority minimum contention interval "I_min" equals two hundred milliseconds ("I_min=200 ms"), the prescribed maximum contention interval "I_max" equals thirty-two hundred milliseconds ("I_max=3200 ms), and the redundancy constant equals two ("k=2"), the wireless network devices "N3", "N4", and "N10" each wait at an initial waiting interval (i.e., an idle contention interval) 66a of least half of priority minimum contention interval (e.g., "I_N3_1=100 ms"), (e.g., an initial waiting interval 66a of at least fifty milliseconds (50 ms)) before initiation of the first active contention interval 68a (i.e., the second half of the priority minimum contention interval).

Hence, the processor circuit 42 of each of the network devices "N1" through "N10" determine whether a wireless data packet 20 is received in operation 70; if in operation 72 a wireless network device 14 detects receiving a "new" data packet having a new sequence number, the wireless network device 14 resets and returns to operation 56 for the new data packet; assuming in operation 72 the wireless network device 14 detects the received wireless data packet 20 is not new (i.e., a copy of the previously-received wireless data packet 20), the processor circuit 42 of the wireless network device 14 increments the copy counter "c" in operation 74.

The processor circuit 42 of each wireless network device "N1" 14 (e.g., "N1" through "N10") continues waiting in operation 76 until having reached at operation 78 the corresponding randomized position "t_Ni" within the second half 68 of its contention interval "I_Ni_j". As illustrated in FIG. 5, the powerline wireless network devices "N3", "N4", and "N10" 14 initiate their active contention interval 68a after an initial waiting interval 66a of 50 ms, whereas the battery-operated wireless network devices "N1", "N2" and "N5" through "N9" initiate their active contention interval 68b after an initial waiting interval 66b of 100 ms following event 54.

Hence, assume at event 80 (t=55 ms) of FIG. 5 that the wireless network device "N3" 14 is the first to reach its randomized position (e.g., "t_N3=55 ms") at operation 78, hence the processor circuit 42 of the wireless network device "N3" 14 at event 80 in operation 82 determines that its copy counter "c" equals zero; since the corresponding counter "c" is less than the redundancy constant "k", the processor circuit 42 of the wireless network device "N3" 14 in operation 82 retransmits (18 in FIG. 1) the wireless data packet 20. In response to retransmitting 18 the wireless data packet 20, the processor circuit 42 of the wireless network device "N3" 14 also sends (e.g., via unicast transmission) a message to the PCE device 12 requesting membership in the dominating set 16; the processor circuit 42 of the wireless network device "N3" 14 also specifies in the message to the PCE device 12 any sources of the received wireless data packet 20, in this case the border router "BBR_A" 22.

The processor circuit 42 of the wireless network device "N3" 14 in operation 84 continues to wait until expiration of its contention interval "I_N3_1" (including the active contention interval 68a) within the first retransmission cycle 62a. In response to expiration of its active contention interval 68a, the retransmission cycle 62 of the wireless network device "N3" (as well as "N4" and "N10") 14 in operation 90 begins its next retransmission cycle ("j+1") 62b by resetting the control bit in its stored wireless data packet 20 to zero (to distinguish from the first retransmission cycle 62a and subsequent retransmission cycles 62), doubling its minimum contention interval (or setting to the maximum "I_max", whichever is less), and starting the next retransmission cycle in operation 64. Hence, the doubling of the minimum contention interval requires the wireless network devices "N3", "N4", and "N10" to wait the new waiting interval 66 of 100 ms before their next active contention interval 68h.

Assume the wireless data packet 20 retransmitted by the wireless network device "N3" 14 at event 80 is detected by the wireless network devices "N1", "N2" and "N4" through "N15". The wireless network devices "N1", "N2", and "N4" through "N10" detect the wireless data packet 20 as a copy of the wireless data packet 20 received at event 54, and in response increment their counters in operation 74. In contrast, the wireless network devices "N11" through "N15" detect the wireless data packet 20 as a new data packet in operation 56 and in response initiate the prescribed randomized collision avoidance method, selecting the non-priority minimum contention interval "I_min" as their prescribed minimum contention interval in operation 56. Hence, the wireless network devices "N11" through "N15" initiate their active contention interval 68c after an initial waiting interval 66b of 100 ms following event 80.

Assume at event 86 (t=67 ms) of FIG. 5 that the wireless network device "N10" 14 reaches its randomized position (e.g., "t_N10=67 ms") at operation 78, hence the processor circuit 42 of the wireless network device "N10" 14 at event 86 in operation 82 determines that its copy counter "c" equals one ("c=1") based on the retransmission by the network device "N3" at event 80; in response to detecting the corresponding counter "c=1" is less than the redundancy constant "k=2", the processor circuit 42 of the wireless network device "N10" 14 in operation 82 retransmits the wireless data packet 20 (18 in FIG. 1) at event 86. In response to retransmitting 18 the wireless data packet 20, the processor circuit 42 of the wireless network device "N10" 14 also sends (e.g., via unicast transmission) a message to the PCE device 12 requesting membership in the dominating set 16; the processor circuit 42 of the wireless network device "N10" 14 also specifies in the message to the PCE device 12 any sources of the received wireless data packet 20, namely the border router "BBR_A" 22 and the wireless network device "N3". The processor circuit 42 of the wireless network device "N10" 14 in operation 84 continues to wait until expiration of its contention interval "I_N10_1" (including the active contention interval 68a) within the first retransmission cycle 62a.

Assume the wireless data packet 20 retransmitted by the wireless network device "N10" 14 at event 86 is detected by the wireless network devices "N1" through "N6", "N8", "N9", and "N11" through "N22". The wireless network devices "N1" through "N6", "N8", "N9", and "N11" through "N16" detect the wireless data packet 20 as a copy of the wireless data packet 20 received at event 54 and/or 80, and in response increment their counters in operation 74. In contrast, the wireless network devices "N17" through "N22" detect the wireless data packet 20 as a new data packet in operation 56 and in response initiate the prescribed randomized collision avoidance method; powered network device "N17" selects the priority minimum contention interval (e.g., 100 ms), whereas the network devices "N18" through "N22" select the non-priority minimum contention interval "I_min" (e.g., 200 ms) as their prescribed minimum contention interval in operation 56. Hence, the wireless network device "N17" initiates its active contention interval 68d after an initial waiting interval 66a of 50 ms following event 86, whereas the wireless network devices "N18" through "N22" initiate their active contention interval 68e after an initial waiting interval 66b of 100 ms following event 86.

As apparent from the foregoing, each retransmission 18 results in either a wireless network device 14 incrementing its copy counter "c" at operation 74, or the wireless network device 14 detecting the retransmission 18 as a new wireless data packet 20 at operation 56. Hence, the network devices "N1", "N2", "N4" through "N6", "N8" and "N9" having incremented their counter "c" in response to the retransmission 18 at events 80 and 86 will defer (i.e., suppress) any transmission during their corresponding active contention interval 68 based on their counter reaching the redundancy constant "c=k=2".

Assume at event 88 (e.g., t=162 ms) that the wireless network device "N12" 14 reaches its randomized position (e.g., "t_N12=107 ms") at operation 78, hence the processor circuit 42 of the wireless network device "N12" 14 at event 88 in operation 82 determines that its copy counter "c" equals one ("c=1") based on the retransmission by the network device "N10" at event 86, and retransmits the wireless data packet 20 (18 in FIG. 1) at event 88 in response to detecting the corresponding counter "c=1" is less than the redundancy constant "k=2". The processor circuit 42 of the wireless network device "N12" 14 also sends (e.g., via unicast transmission) a message to the PCE device 12 requesting membership in the dominating set 16, specifying the parent network devices "N3" and "N10". The wireless network device "N12" 14 in operation 84 continues to wait until expiration of its contention interval "I_N12_1" (including the active contention interval 68c) within the first retransmission cycle 62a.

In response to detecting at event 88 the wireless data packet 20 retransmitted by the wireless network device "N12", the wireless network devices "N1" through "N11", "N13", "N14", "N16" through "N19" and "N22" can increment their copy counter "c" in operation 74, and the network device "N26" can respond to the new wireless data packet 20 in operation 56. Hence, the wireless network device "N26" 14 can select the non-priority minimum contention interval "I_min" as its prescribed minimum contention interval in operation 56, and can initiate its active contention interval 68f after an initial waiting interval 66b of 100 ms following event 88.

Assume at event 92 (t=164 ms) that the wireless network device "N17" 14 reaches its randomized position (e.g., "t_N12=97 ms") at operation 78, hence the processor circuit 42 of the wireless network device "N17" 14 at event 92 in operation 82 determines that its copy counter "c" equals one ("c=1") based on the retransmission by the network device "N12" at event 88, and retransmits the wireless data packet 20 (18 in FIG. 1) at event 92 in response to detecting the corresponding counter "c=1" is less than the redundancy constant "k=2". The processor circuit 42 of the wireless network device "N12" 14 also sends (e.g., via unicast transmission) a message to the PCE device 12 requesting membership in the dominating set 16, specifying the parent network devices "N10" and "N12". The wireless network device "N17" 14 in operation 84 continues to wait until expiration of its contention interval "I_N17_1" (including the active contention interval 68d) within the first retransmission cycle 62a, after which it resets in operation 90 to the next retransmission cycle.

In response to detecting at event 92 the wireless data packet 20 retransmitted by the wireless network device "N17", the wireless network devices "N10" through "N16", "N18" through "N22", and "N26" can increment their copy counter "c" in operation 74, and the network devices "N23", "N24", and "N27" can respond to the new wireless data packet 20 in operation 56. Hence, the wireless network devices "N23", "N24", and "N27" 14 can select the non-priority minimum contention interval "I_min" as their prescribed minimum contention interval in operation 56, and initiate their active contention interval 68f after an initial waiting interval 66b of 100 ms following event 92.

As apparent from the foregoing, all the wireless network devices 14 have received the wireless data packet 20, except for the isolated wireless network device "N25" 14 due to the obstruction 32 blocking the retransmission by the wireless network device "N17" 14. Hence, the control bit "c" is reset in operation 90 within a subsequent retransmission cycle 62b to enable a wireless network device (e.g., "N23") at event 96 to retransmit the wireless data packet 20 during its active contention interval 68j, following the retransmission by the powered wireless network device "N17" at event 94 during its active contention interval 68i. Note in operation 82 that since the control bit is reset to zero for the subsequent retransmission cycle 62b, the wireless network device "N23" will not request membership in the dominating set 16 in response to retransmitting the wireless data packet 20.

In response to the processor circuit 42 of the wireless network device "N25" 14 detecting in operation 56 the new wireless data packet 20 retransmitted by the wireless network device "N23" at event 96, the wireless network device "N25" 14 can detect that the control bit is reset to zero, indicating the first retransmission cycle 62a was missed by the wireless network device "N25" 14. Referring to FIG. 3B, in response to the processor circuit 42 of the wireless network device "N25" 14 detecting in operation 100 that the control bit is zero, the receiving wireless network device "N25" in operation 102 can send a unicast message, source wireless network device "N23", requesting that the source wireless network device "N23" become a member of the dominating set 16, effectively overriding the control bit requirement of operation 82. Hence, the wireless network device "N23" 14 in operation 104 can send to the PCE device 12 a request to become a member of the dominating set 16, and can specify in the request its parent network device (e.g., "N17"). The processor circuit 42 of the PCE device 12 in operation 106 can respond to the request by adding the wireless network device "N23" 14 to the dominating set 16, ensuring reachability to the isolated network device "N25" 14.

Hence, as illustrated in FIG. 4, the device interface circuit 40 of the PCE device 12 in operation 110 can receive messages from each of the wireless network devices "N3", "N10", "N12", and "N17" requesting membership in the dominating set 16 in response to retransmission 18 within the first retransmission cycle 62a, and from the wireless network device "N23" requesting membership in response to the unicast request from the child network device "N25" caused by the retransmission 18 by the wireless network device "N23" in the subsequent retransmission cycle 62b. The received messages specify the parent list for each of the requesting wireless network devices "N3", "N10", "N12", "N17" and "N23" 14, enabling the PCE device 12 to in operation 112 to add the requesting wireless network devices to the dominating set 16 and generate optimized routes for reaching any wireless network device 14 in the data network 10 via one or more of the requesting wireless network devices "N3", "N10", "N12", "N17" and "N23" 14.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   receiving, by a network device in a data network, a wireless data packet containing new data;
   responding to the wireless data packet, by the network device, by initiating a prescribed randomized collision avoidance method requiring the network device to first wait at least a first half of a prescribed minimum contention interval before attempting transmission at a randomized position within a second half of the prescribed minimum contention interval;
   selectively retransmitting, by the network device, the wireless data packet based on determining, at the randomized position, that the network device has not received a prescribed number of copies of the wireless data packet; and selectively sending, by the network device to a path computation element in the data network, a message requesting membership in a dominating set in response to transmission of the wireless data packet by the network device.

2. The method of claim 1, wherein the message specifies one or more transmitting network devices having transmitted the prescribed number of copies received by the network device, enabling the path computation element to identify the one or more transmitting network devices as one or more parent network devices for reaching the network device.

3. The method of claim 1, wherein:
the initiating includes selecting the prescribed minimum contention interval from one of at least a non-priority minimum contention interval or a priority minimum contention interval based on one or more prescribed device attributes associated with the network device, the priority minimum contention interval substantially less than the non-priority minimum contention interval;
the prescribed device attributes including any one or more of whether the network device comprises a battery-only power source, or whether the network device is powered by a powerline power source.

4. The method of claim 3, wherein the initiating includes selecting the prescribed minimum contention interval based on a battery level in the network device, including selecting a longer minimum contention interval for a corresponding lower battery level.

5. The method of claim 1, wherein the selectively retransmitting includes setting a control bit indicating the retransmitting is part of a first retransmission cycle of the prescribed randomized collision avoidance method, the method further comprising:
initiating a subsequent retransmission cycle based on resetting the prescribed minimum contention interval, upon expiration thereof, to a second contention interval substantially longer than the prescribed minimum contention interval, selecting a second randomized position within a second half of the second contention interval, and resetting a counter value identifying a number of copies of the wireless data packet having been received by the network device;
selectively retransmitting the wireless data packet, with the control bit reset, based on determining at the second randomized position that the counter value indicates the network device has not received the prescribed number of copies of the wireless data packet, the reset of the control bit enabling another network device to distinguish between retransmissions in the first retransmission cycle and the retransmissions following the first retransmission cycle.

6. The method of claim 5, further comprising:
receiving from a second network device, following retransmission of the wireless data packet with the control bit reset, a second message requesting the network device become a member of the dominating set to provide reachability to the second network device; and
sending the message requesting membership in the dominating set in response to the second message, for reachability to the second network device in the data network.

7. The method of claim 1, further comprising:
detecting in the wireless data packet a control bit indicating that the wireless data packet was transmitted following a first retransmission cycle of the prescribed randomized collision avoidance method;
determining from the control bit that the network device did not receive any copy of the wireless data packet during the first retransmission cycle; and
sending, to a source network device of the wireless data packet, a message requesting the source network device become a member of the dominating set, for reachability to the network device in the data network.

8. An apparatus comprising:
a device interface circuit configured for receiving, in a data network, a wireless data packet containing new data; and
a processor circuit configured for responding to the wireless data packet by initiating a prescribed randomized collision avoidance method requiring the apparatus to first wait at least a first half of a prescribed minimum contention interval before attempting transmission at a randomized position within a second half of the prescribed minimum contention interval;
the processor circuit further configured for selectively retransmitting the wireless data packet via the device interface circuit based on determining, at the randomized position, that the apparatus has not received a prescribed number of copies of the wireless data packet;
the processor circuit further configured for selectively sending, via the device interface circuit to a path computation element in the data network, a message requesting membership in a dominating set in response to transmission of the wireless data packet by the apparatus.

9. The apparatus of claim 8, wherein the message generated by the processor circuit specifies one or more transmitting network devices having transmitted the prescribed number of copies received by the apparatus, enabling the path computation element to identify the one or more transmitting network devices as one or more parent network devices for reaching the apparatus.

10. The apparatus of claim 8, wherein:
the processor circuit is configured for selecting the prescribed minimum contention interval from one of at least a non-priority minimum contention interval or a priority minimum contention interval based on one or more prescribed device attributes associated with the apparatus, the priority minimum contention interval substantially less than the non-priority minimum contention interval;
the prescribed device attributes including any one or more of whether the apparatus comprises a battery-only power source, or whether the apparatus is powered by a powerline power source.

11. The apparatus of claim 10, wherein the processor circuit is configured for selecting the prescribed minimum contention interval based on a battery level in the apparatus, including selecting a longer minimum contention interval for a corresponding lower battery level.

12. The apparatus of claim 8, wherein:
the processor circuit is configured for setting a control bit indicating the retransmitting is part of a first retransmission cycle of the prescribed randomized collision avoidance method;
the processor circuit is configured for initiating a subsequent retransmission cycle based on resetting the prescribed minimum contention interval, upon expiration thereof, to a second contention interval substantially longer than the prescribed minimum contention interval, selecting a second randomized position within a second half of the second contention interval, and resetting a counter value identifying a number of copies of the wireless data packet having been received by the apparatus;

the processor circuit is configured for selectively retransmitting the wireless data packet, with the control bit reset, based on determining at the second randomized position that the counter value indicates the apparatus has not received the prescribed number of copies of the wireless data packet, the reset of the control bit enabling another network device to distinguish between retransmissions in the first retransmission cycle and the retransmissions following the first retransmission cycle.

13. The apparatus of claim 12, wherein:

the device interface circuit is configured for receiving, from a second network device following retransmission of the wireless data packet with the control bit reset, a second message requesting the apparatus become a member of the dominating set to provide reachability to the second network device;

the processor circuit is configured for generating and sending the message requesting membership in the dominating set in response to the second message, for reachability to the second network device in the data network.

14. The apparatus of claim 8, wherein:

the processor circuit is configured for detecting in the wireless data packet a control bit indicating that the wireless data packet was transmitted following a first retransmission cycle of the prescribed randomized collision avoidance method;

the processor circuit is configured for determining, based on the control bit, that the network device did not receive any copy of the wireless data packet during the first retransmission cycle; and the processor circuit is configured for generating and sending, via the device interface circuit to a source network device of the wireless data packet, a message requesting the source network device become a member of the dominating set, for reachability to the apparatus in the data network.

15. One or more non-transitory tangible media encoded with logic for execution by a machine and when executed by the machine operable for:

receiving, by the machine implemented as a network device in a data network, a wireless data packet containing new data;

responding to the wireless data packet, by the network device, by initiating a prescribed randomized collision avoidance method requiring the network device to first wait at least a first half of a prescribed minimum contention interval before attempting transmission at a randomized position within a second half of the prescribed minimum contention interval;

selectively retransmitting, by the network device, the wireless data packet based on determining, at the randomized position, that the network device has not received a prescribed number of copies of the wireless data packet; and selectively sending, by the network device to a path computation element in the data network, a message requesting membership in a dominating set in response to transmission of the wireless data packet by the network device.

16. The one or more non-transitory tangible media of claim 15, wherein the message specifies one or more transmitting network devices having transmitted the prescribed number of copies received by the network device, enabling the path computation element to identify the one or more transmitting network devices as one or more parent network devices for reaching the network device.

17. The one or more non-transitory tangible media of claim 15, wherein:

the initiating includes selecting the prescribed minimum contention interval from one of at least a non-priority minimum contention interval or a priority minimum contention interval based on one or more prescribed device attributes associated with the network device, the priority minimum contention interval substantially less than the non-priority minimum contention interval;

the prescribed device attributes including any one or more of whether the network device comprises a battery-only power source, or whether the network device is powered by a powerline power source.

18. The one or more non-transitory tangible media of claim 15, wherein the selectively retransmitting includes setting a control bit indicating the retransmitting is part of a first retransmission cycle of the prescribed randomized collision avoidance method, the one or more non-transitory tangible media further operable for:

initiating a subsequent retransmission cycle based on resetting the prescribed minimum contention interval, upon expiration thereof, to a second contention interval substantially longer than the prescribed minimum contention interval, selecting a second randomized position within a second half of the second contention interval, and resetting a counter value identifying a number of copies of the wireless data packet having been received by the network device;

selectively retransmitting the wireless data packet, with the control bit reset, based on determining at the second randomized position that the counter value indicates the network device has not received the prescribed number of copies of the wireless data packet, the reset of the control bit enabling another network device to distinguish between retransmissions in the first retransmission cycle and the retransmissions following the first retransmission cycle.

19. The one or more non-transitory tangible media of claim 18, further operable for:

receiving from a second network device, following retransmission of the wireless data packet with the control bit reset, a second message requesting the network device become a member of the dominating set to provide reachability to the second network device; and sending the message requesting membership in the dominating set in response to the second message, for reachability to the second network device in the data network.

20. The one or more non-transitory tangible media of claim 15, further operable for:

detecting in the wireless data packet a control bit indicating that the wireless data packet was transmitted following a first retransmission cycle of the prescribed randomized collision avoidance method;

determining from the control bit that the network device did not receive any copy of the wireless data packet during the first retransmission cycle; and sending, to a source network device of the wireless data packet, a message requesting the source network device become a member of the dominating set, for reachability to the network device in the data network.

21. A method comprising:

a path computation device receiving device information from requesting network devices, each requesting network device having retransmitted a data packet in a data network according to a prescribed randomized collision avoidance method requiring each network device in the data network to first wait at least a first half of a prescribed contention interval before attempting transmission, at a corresponding randomized position within a second half of the prescribed contention interval, if the corresponding network device has not received a prescribed number of copies of the wireless data packet; and the path computation device classifying each requesting network device having retransmitted the data packet, according to the prescribed randomized collision avoidance method, as belonging to a dominating set, for generation of optimized routes for reaching any network device in the data network via one or more of the requesting network devices.

22. One or more non-transitory tangible media encoded with logic for execution by a machine and when executed by the machine operable for:

a path computation device receiving device information from requesting network devices, each requesting network device having retransmitted a data packet in a data network according to a prescribed randomized collision avoidance method requiring each network device in the data network to first wait at least a first half of a prescribed contention interval before attempting transmission, at a corresponding randomized position within a second half of the prescribed contention interval, if the corresponding network device has not received a prescribed number of copies of the wireless data packet; and the path computation device classifying each requesting network device having retransmitted the data packet, according to the prescribed randomized collision avoidance method, as belonging to a dominating set, for generation of optimized routes for reaching any network device in the data network via one or more of the requesting network devices.

* * * * *